(12) United States Patent
Weinstein (10) Patent No.: US 6,239,601 B1
(45) Date of Patent: May 29, 2001

(54) THICKNESS MEASUREMENT DEVICE FOR ICE, OR ICE MIXED WITH WATER OR OTHER LIQUID

(75) Inventor: Leonard M. Weinstein, Newport News, VA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 09/545,860

(22) Filed: Apr. 4, 2000

Related U.S. Application Data (63) Continuation-in-part of application No. 09/060,590, filed on Apr. 15, 1998, now abandoned, which is a continuation-in-part of application No. 08/619,779, filed on Mar. 20, 1996, now abandoned.

(51) Int. Cl.[7] ............ G01R 27/26; G01R 27/28; G01W 1/00; G06F 19/00; G01F 23/00
(52) U.S. Cl. ............ 324/662; 324/649; 324/662; 324/667; 73/304 C; 73/170.26; 702/57
(58) Field of Search .................... 324/649, 662, 324/658, 650, 667, 674, 600; 702/33, 57; 73/290 R, 304 C, 170.26

(56) References Cited

U.S. PATENT DOCUMENTS

| | | | |
|---|---|---|---|
| 3,882,381 | * | 5/1975 | Gregory .................... 324/667 |
| 3,986,110 | | 10/1976 | Overall et al. . |
| 4,766,369 | | 8/1988 | Weinstein . |
| 5,191,791 | * | 3/1993 | Gerardi et al. ............ 324/178 R |
| 5,394,340 | * | 2/1995 | Inkpen ...................... 702/33 |
| 5,793,640 | * | 8/1998 | Wu et al. .................. 702/65 |
| 5,955,887 | * | 9/1999 | Codner et al. ............ 324/689 |

* cited by examiner

*Primary Examiner*—Safet Metjahic
*Assistant Examiner*—Anjan K. Deb
(74) *Attorney, Agent, or Firm*—Kurt G. Hammerle (57) ABSTRACT

A device and method are provided for determining the thickness of a layer of solid ice, a mixture of ice and water, or a mixture of ice and other liquid, accumulated on the outer surface of an object. First and second total impedance sensors are operated at first and second frequencies. Corresponding first and second AC total impedance measuring circuits are coupled to the first and second sensors to produce output voltages based on the total impedance changes sensed by the sensors. A processor is coupled to the first and second measuring circuits to generate an output value using the measured output voltages. The output value is indicative of the thickness of the ice or ice and water mixture, or ice and other liquid.

12 Claims, 4 Drawing Sheets

THICKNESS MEASUREMENT DEVICE FOR ICE, OR ICE MIXED WITH WATER OR OTHER LIQUID

CROSS REFERENCE

This application is a continuation-in-part application of commonly owned, patent application Ser. No. 09/060,590, filed Apr. 15, 1998, now abandoned which is a continuation-in-part application of application Ser. No. 08/619,779, filed Mar. 20, 1996, now abandoned.

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

1. Field of the Invention

The invention relates generally to measurement devices and more specifically to a device and method for determining the thickness of a layer of ice, or a layer containing a mixture of ice and water or other liquid.

2. Description of the Related Art

This applicant in U.S. Pat. No. 4,766,369, which is hereby incorporated by reference, disclosed a dual-geometry, capacitance-type ice thickness-measuring gauge. The gauge disclosed therein uses two capacitance sensors having greatly different electrode configurations and spacing to measure the thickness of surface ice independently of the temperature and impurities in the ice. That device works well if the ice is homogeneously solid, with no water or other liquid mixed in the ice, and when the temperature is not close to the melting point.

Ice formation often occurs with some liquid water present. In certain applications, e.g., aircraft icing, conditions, runway or roadway icing conditions, etc., it is critical to know that ice is forming and to determine its thickness even if it is not completely frozen. For such cases when liquid water is present, or when ice is not far from the freezing temperature, the electrical conductivity of the ice can be a significant or even dominant part of the total impedance across the ice. This conductivity, which is not accounted for in the dual geometry gage of U.S. Pat. No. 4,766,369, could result in indicated thickness measurements which are highly inaccurate if this term is not properly accounted for.

SUMMARY OF THE INVENTION

Accordingly, it is an object of the present invention to provide a thickness measurement device and method that determines the thickness of a layer of ice, or a layer of ice having, some water or other liquid mixed with the ice, over a surface.

The foregoing and additional objects of the present invention, which will become more obvious are attained by providing a device and method for determining the thickness of an ice layer, which may have liquid water or other liquid content, accumulated over the surface of the device.

A temperature sensor is first used to determine if freezing conditions, i.e., temperatures below 0° C., are even possible. If freezing, conditions are possible, and ice accumulation is suspected, the system measures the suspected ice thickness. Thickness measurements would be obtained for the layer whether it is ice or a mixture of ice and water or other liquid. The measurement would be obtained by using two different geometry gages at two predetermined frequencies. The predetermined frequencies would be selected in a range where the dielectric constant and the relative conductivity of both ice and water are relatively frequency independent.

A first total impedance sensor with its measurement circuit measures the near wall effect of the accumulations of coating material at the two selected frequencies. A second total impedance sensor along with its measurement circuit measures the bulk average effect of the accumulation of the coating material all the way from the wall to the outer surface of the layer at the same two frequencies. An analog circuit (or computer program) processes the outputs from the first and second measuring circuits to separate, for both gages, the value of capacitance from the total impedance. This capacitance is a far better indicator of thickness than total impedance due to the far lower variation in the dielectric constant value for ice, or ice with a small amount of water, compared to the variation in conductivity. The ratio of capacitance can then be used in a similar fashion to the method of U.S. Pat. No. 4,766,369 to obtain thickness. One of the novel features of the present invention is to identify and remove the conductivity effects from the impedance data to properly obtain a more accurate capacitance response.

DETAILED DESCRIPTION OF THE INVENTION

Figure 1:
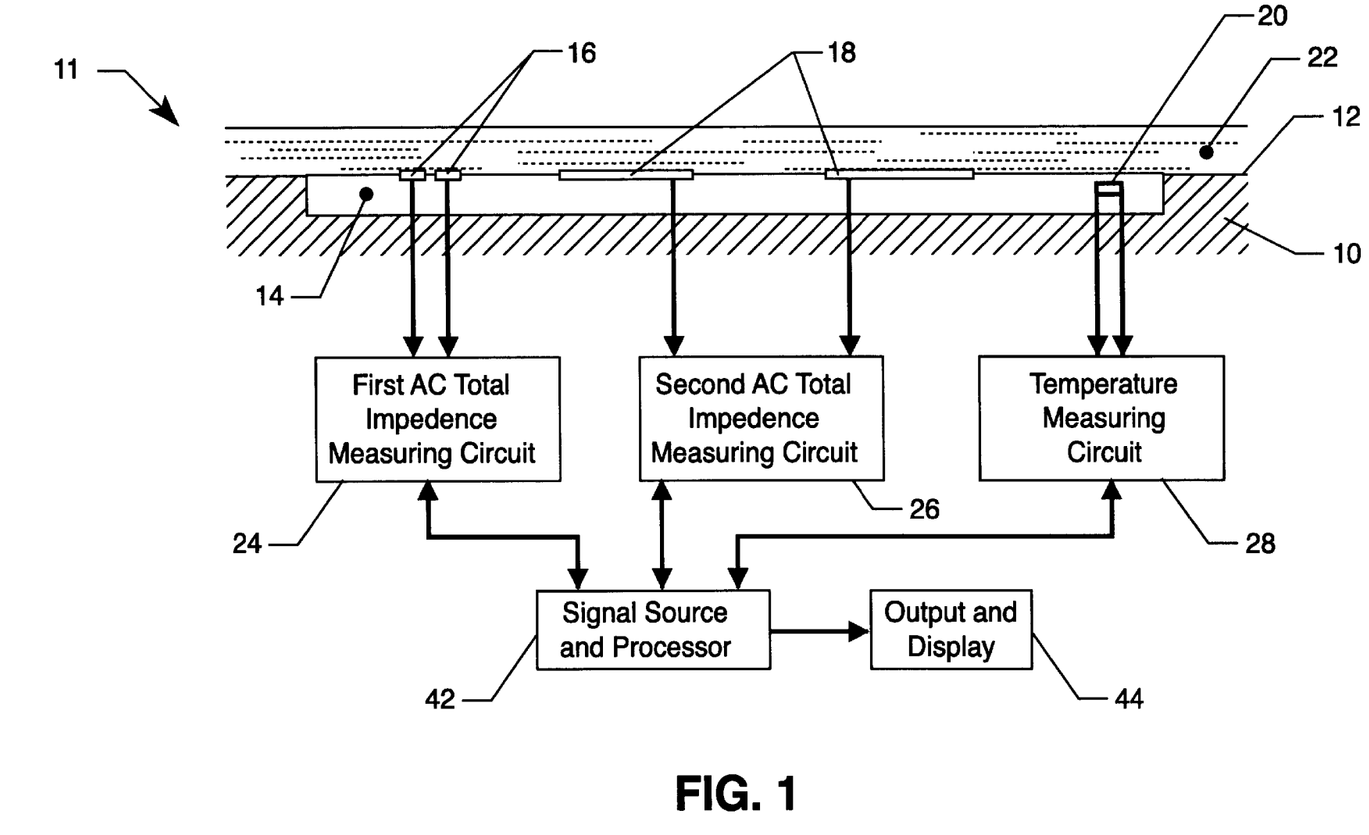
FIG. 1 is a schematic diagram of the thickness measurement device of the present invention showing the relative locations of the various sensors at the surface of interest.

Referring now to the drawings and more particularly to FIG. 1, the thickness-measuring device of the present invention is shown and referenced generally by numeral 11. Device 11 comprises a first total impedance sensor 16, a second total impedance sensor 18, a temperature sensor 20, a first AC total impedance measuring circuit 24, a second AC total impedance measuring circuit 26, a temperature measuring circuit 28, a signal source and processor 42, and display 44. The term "total impedance" generally refers to the combination of resistance, capacitance, and inductance. However, in terms of the present invention, inductance is negligible because no coils or coil geometries are present in the components or the electrical representations thereof Accordingly, the term "total impedance" as used herein refers to only the combination of resistance and capacitance measured by each of sensors 16 and 18, and is represented generally by complex impededance $Z_n$, where n is an integer corresponding to a particular frequency.

Device 11 is mounted flush with the outer surface 12 of any surface of interest such as a runway, a roadway, an aircraft surface, or the like. By way of example, outer surface 12 may be part of an aircraft 10. This outer surface 12 may be on the wing, the engine intake, or any other surface of aircraft 10 where the formation of ice is detrimental. A small section of outer surface 12 is removed and replaced with an insulating embedding material 14, which, for example could be plastic or an epoxy-type material. Alternately, a slightly built up patch containing the sensors is attached on top of the outer surface.

Sensors 16, 18, and 20 are embedded in embedding material 14. The surfaces of sensors 16, 18 and 20 can be exposed to accumulated material 22 residing on outer surface 12. For purpose of the following description, material 22 is an ice or ice and liquid mixture, such as ice and water, accumulated on outer surface 12 except where otherwise noted. To avoid corrosion problems, sensors 16, 18, and 20 are made from a corrosion resisting material. Embedding material 14 is contoured and smoothed so that it is nearly flush with outer surface 12 to minimize any disruption in the contour of outer surface 12.

First total impedance sensor 16, second total impedance sensor 18, and temperature sensor 20 are connected respectively to first AC total impedance measuring circuit 24, second AC total impedance measuring circuit 26, and temperature measuring circuit 28. The outputs of first and second total impedance measuring circuits 24 and 26 and temperature measuring circuit 28 are connected to signal source and processor 42. The output of processor 42 is typically passed to an output device such as display 44.

Temperature sensor 20 may be any one of several standard temperature sensors, such as a resistance film sensor, a thermocouple or an integrated circuit temperature sensor. Temperature measuring circuit 28 receives the output of temperature sensor 20 and determines the temperature at outer surface 12 and thereby the temperature of material 22, on outer surface 12. Such circuits are well known to one with ordinary skill in the art for each type of temperature sensor suggested. The determined temperature is shown on display 44 and serves as an indicator or warning that conditions may be suitable for ice formation.

Total impedance sensors 16 and 18 are geometrically configured in different ways so that each has a different electrical response to the presence of ice (or an ice and water mixture). Preferably, one sensor is geometrically configured to measure the presence of small ice or ice and water thicknesses (i.e., the near wall effect of the accumulation), while the other sensor is geometrically configured to measure large ice or ice and water thicknesses, i.e., the bulk average effect of the accumulated material 22. For example, the first total impedance sensor 16 is constructed using small conductors separated by a small gap so that there is a large change in response for small thicknesses of material 22. On the other hand, second total impedance sensor 18 is constructed using larger conductors separated by a larger gap relative to sensor 16, such gap also being larger than the maximum expected thickness of material 22. Alternatively, sensors 16 and 18 may be configured in an opposite fashion, i.e., sensor 16 may have large conductors and sensor 18 may have small conductors.

Figure 2:
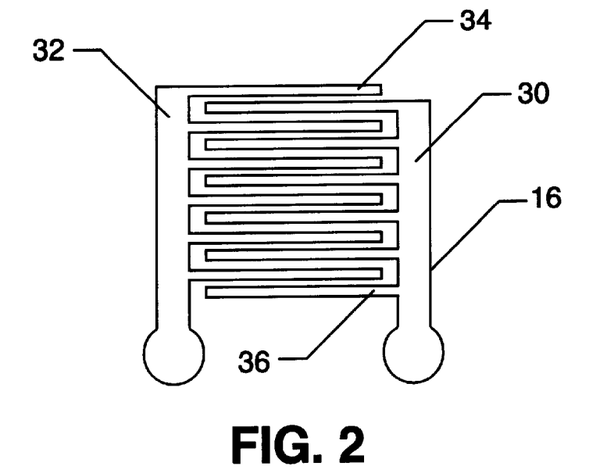
FIG. 2 is a schematic diagram of a first total impedance sensor used in the thickness-measuring device.

By way of an illustrative example, consider measuring ice, a mixture of ice and water, or a mixture of ice and a liquid such as antifreeze solution in the thickness range from 0.01 inches to 0.33 inches. First total impedance sensor 16 is shown in FIG. 2. Opposite sides of first total impedance sensor 16 are formed from parallel leads 30 and 32. Each of the two leads has connected respectively thereto a series of interleaved electrodes 34 and 36. Electrodes 34 and 36 are connected to leads 30 and 32. Electrodes 34 and 36 do not touch each other and hence the presence of material covering electrodes 34 and 36 causes a change in total impedance measured between electrodes 34 and 36. While the dimensions of first total impedance sensor 16 may vary, a typical distance between the outside edges of leads 30 and 32 is 0.75 inch. Likewise, the length of leads 30 and 32 that contain the connections to electrodes 34 and 36 is about 0.75 inch. Electrodes 34 and 36 are approximately 0.02 inch wide and have gaps of approximately 0.01 inch between them.

Figure 3:
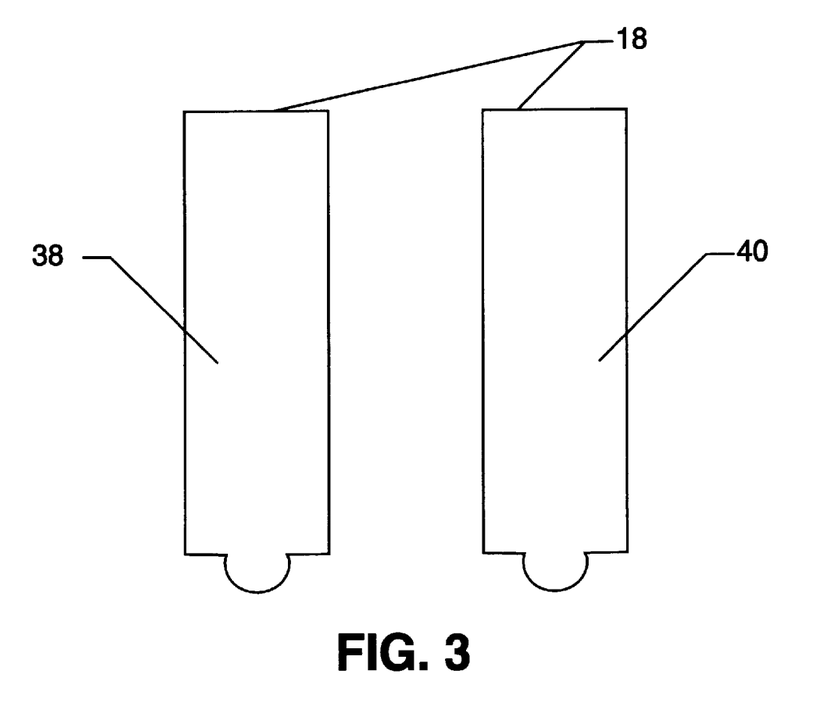
FIG. 3 is a schematic diagram of a second total impedance sensor used in the thickness-measuring device.

For pairing with sensor 16 of the configuration and size shown in FIG. 2, an illustrative example of second total impedance sensor 18 is shown in FIG. 3 and comprises two leads 38 and 40 that are substantially parallel to each other. While the dimensions of second total impedance sensor 18 may vary, a typical distance between the outside edges of leads 38 and 40 is two inches. Parallel leads 38 and 40 each are formed from rectangular conductors, which covers one-third of the distance between the outer edges of leads 38 and 40. This distance is 0.67 inch; thus, the distance between the inside edges of the conductors is 0.67 inch. The length of each conductor is two inches. Both first total impedance sensor 16 and second total impedance sensor 18 can be made from any thickness of a conductive material compatible with the surface geometry of the sensor. The illustrative example uses a thickness of approximately 0.001 inches.

Referring once again to FIG. 1, first total impedance sensor 16 is electrically connected to first AC total impedance measuring circuit 24 and second total impedance sensor 18 is connected to second AC total impedance measuring circuit 26. Circuits 24 and 26 each comprise substantially similar components except the sensitivity setting components are selected to match approximately corresponding signal levels from each sensor. Each of circuits 24 and 26 are capable of operation for at least two different predetermined frequencies, represented as $f_n$, where n is an integer representing the selected frequencies.

Figure 4:
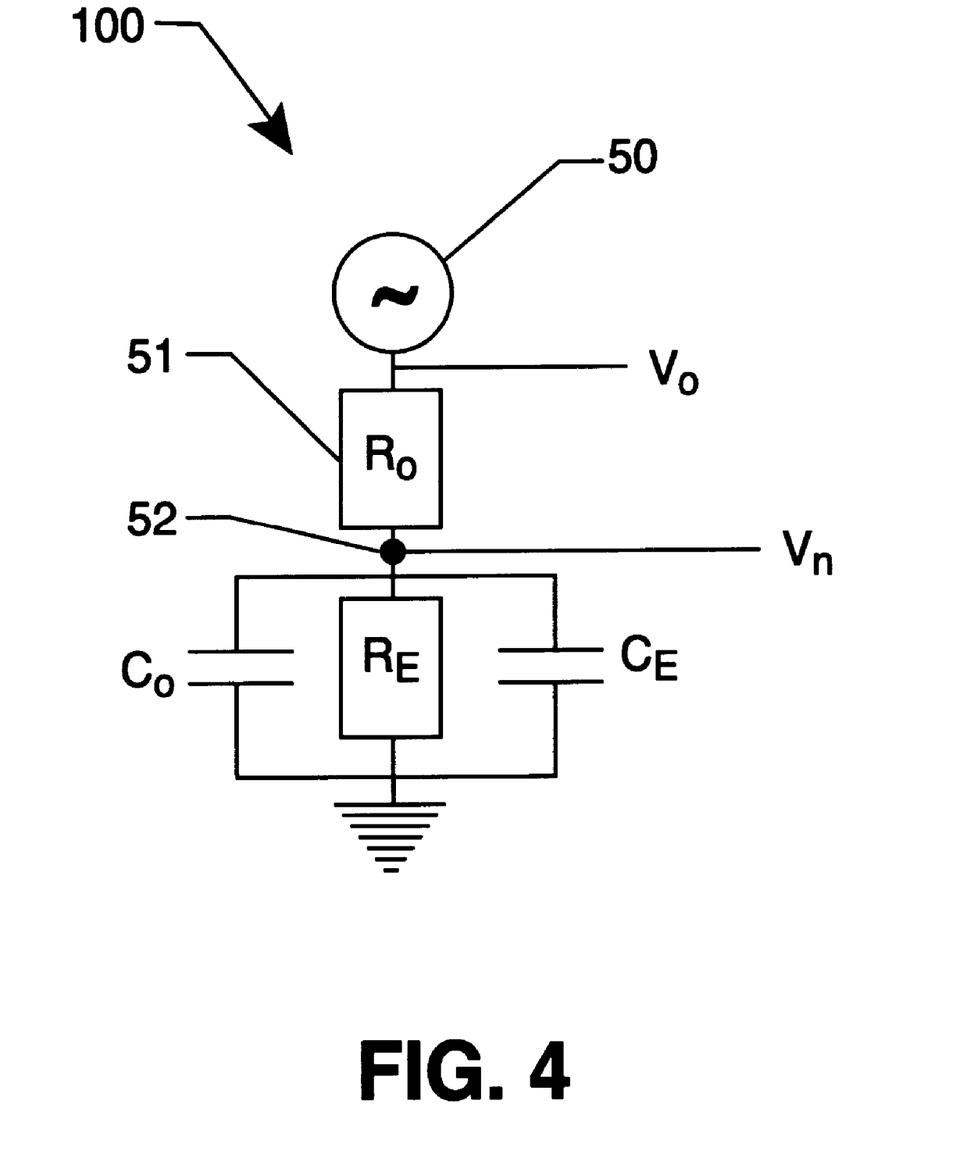
FIG. 4 is a schematic electrical representation of the sensor's impedance components and the impedance measuring circuit.

As shown in FIG. 4, both the sensor 16/measuring circuit 24 combination and the sensor 18/measuring circuit 26 combination can be schematically represented by one sensor/measuring circuit combination as indicated by model circuit 100. Model circuit 100 comprises an adjustable source 50, which corresponds with signal source and processor 42, capable of supplying a known alternating current voltage $V_0$ with an RMS value of $V_0$. Source 50 is capable of operation for at least two predetermined frequencies and is connected in series to a resistor 51 having a known resistance, $R_0$, and in series with a corresponding sensor (either sensor 16 or 18). Each sensor is equivalent to a parallel arrangement of a variable external resistance $R_E$ (due to changes in the conductivity of material 22), a fixed parasitic capacitance $C_0$ (due to the sensor substrate and lead wires capacitance), and a variable capacitance $C_E$ (due to the chages in the effective external dielectric constant and thickness of material 22). Each of circuits 24 and 26 produces an output voltage indicative of a combination of resistive and capacitive changes produced by the proximity of any accumulated material 22 on outer surface 12 for the particular operating frequency $f_n$. The RMS voltage measured between the resistor 51 and the sensor 16 or 18 at node 52 is defined as $V_n$.

Figure 5:
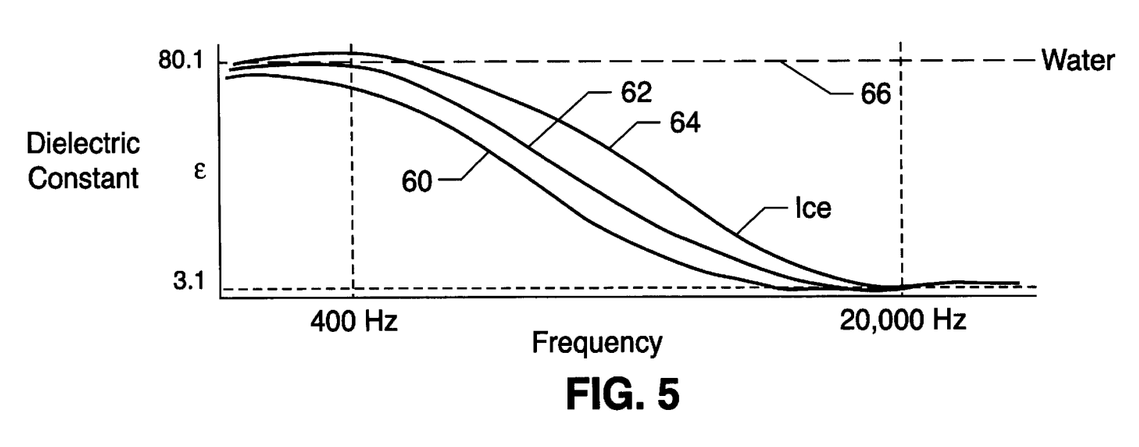
FIG. 5 is a graphical representation of the dielectric constant variation of ice and water as a function of frequency and temperature.

FIG. 5 shows how the dielectric constant of ice and water varies with frequency for the temperature range from near freezing to well below freezing. More specifically, curve 60 represents −20° C., curve 62 represents −10° C., and curve 64 represents −1° C. Water can respond rapidly to changes in electric fields due to the mobility of the molecules. In contrast, ice responds relatively slowly to the variations in the electric field as a result of the constraints of the lattice structure of the ice. Because ice and water have strong molecular dipole moments, the dielectric constant for both water and ice is approximately a value of 80 at "low" frequencies (up to approximately 400 Hz for the temperature range shown here). The water dielectric constant stays nearly constant for greater frequencies, as represented by dashed line 66, due to the characteristic orientation relaxation frequency being above $10^9$ Hz. In contrast, the ice dielectric constant starts falling off rapidly at frequencies above approximately 400 Hz because of a much lower characteristic orientation relaxation frequency. The actual frequency where rapid roll off occurs depends on the temperature and impurities present. For temperatures in the range of greatest interest (−40° C. to 0° C.), the dielectric constant decreases rapidly at frequencies slightly above 400 Hz, and flattens to a new value of dielectric constant (of about 3.1) at frequencies above approximately 20,000 Hz. Much lower temperatures can result in larger roll off to below 400 Hz.

Figure 6:
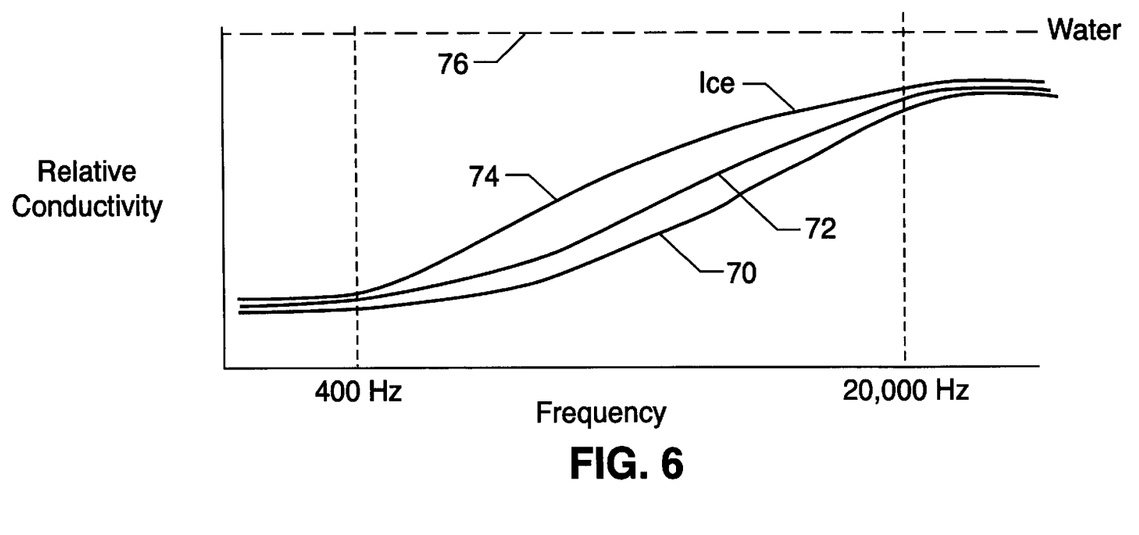
FIG. 6 is a graphical representation showing the variation in relative conductivity of ice and water as a function of frequency and temperature.

As shown in FIG. 6, the conductivity of ice also changes with frequency and temperature. Curve 70 represents −20° C., curve 72 represents −10° C., curve 74 represents −1° C., and dashed line 76 represents liquid water. Because the absolute level of conductivity depends strongly on impurity levels in the water and ice, the curves shown are relative values. At frequencies below the characteristic orientation relaxation frequencies for ice, the restrictive lattice of the solid ice prevents dipole rotation of the ice molecule from allowing significant conductivity. For 0° C. to −40° C., the conductivity of ice starts to increase at frequencies greater than about 400 Hz and levels off to a steady higher value at approximately 20,000 Hz. The location of the start of roll up is also somewhat temperature dependent for the ice. The high mobility of liquid water permits high ion mobility and has a characteristic orientation relaxation frequency above $10^9$ Hz. This combination results in conductivity that is frequency independent in the range of interest here, and that can be extremely large compared to the ice conductivity if significant ions are present.

By reviewing FIGS. 5 and 6, one can make two basic conclusions concerning the dielectric constant and relative conductivity of ice and water: (1) the dielectric constant and the conductivity of ice vary tremendously over some frequency ranges, but vary only slightly in certain other frequency ranges. The frequency ranges with little variation are frequencies less than approximately 400 Hz and frequencies greater than approximately 20,000 Hz, (2) the dielectric constant and conductivity of liquid water are nearly independent of frequency for values less than 1,000 MHz.

The present invention recognizes these two basic conclusions and implements them into its method of measuring the thickness of an accumulated material such as ice or ice and a liquid. Specifically, the method of the present invention comprises measuring the total impedance of the first sensor 16 and of the second sensor 18 for at least two predetermined frequencies $f_1$ and $f_2$ of signal source 42. (For simplicity of discussion, the subscripts 1 and 2 refer to the lower and higher frequency values, respectively, for any set of two frequencies for the remainder of the description.) These two predetermined frequencies are both selected in the same range where the dielectric constant and the relative conductivity of ice and water vary only slightly. For example, frequencies $f_1$ and $f_2$ may both be selected in the same range below approximately 400 Hz, or alternatively both in the same range above approximately 20,000 Hz.

As shown in FIG. 5, for frequencies below 400 Hz, the dielectric constant for ice and water is nearly the same. This characteristic means the presence of water in the ice has the smallest effect on the accuracy of the thickness measurement determined from capacitive effects, even for non-homogenous layers. However, reasonably accurate separation of capacitance and resistance may not always be readily attained at such low frequencies. Accordingly, predetermined frequencies $f_1$ and $f_2$ that are selected in a range greater than 20,000 Hz would also provide beneficial results.

Referring again to FIG. 4, the method of the present invention further comprises generating a plurality of output voltage ratios determined from the total complex impedance of each sensor. Based on model circuit 100, a complex output voltage ratio $$\frac{\overline{V_n}}{\overline{V_o}}$$

may be generally represented by the following equation:

$$\frac{\overline{V_n}}{\overline{V_o}} = \frac{Z_n}{R_o + Z_n}. \tag{1}$$

The variable $Z_n$ is the total complex impedance of sensor 16 or 18 and is represented by the following equation:

$$Z_n = \frac{R_E}{1 + j2\pi f_n R_E C_T}, \tag{2}$$

where $C_T = C_E + C_O$. The value of $C_O$ can be found by measuring $V_n$ when surface 12 is dry, i.e., when no ice or water is present.

The operation of device 11 would require first measuring the output voltages for dry sensors and then finding the values for several known ice thicknesses (up to slightly less that 0.5 of the conductor gap). This step of calibration is then used to give an accurate response of the device 11 to an unknown thickness of ice or a mixture of ice and liquid. This method of calibration will be more fully explained in the Example which follows.

EXAMPLE

Source 50 supplies a known sine wave voltage at angular frequency $\omega_1$, which is equal to $2\pi f_n$. For the present example $\omega_1$ is selected to be $2 \times 10^6$ radians/sec and $\omega_2$ is selected to be $4 \times 10^6$ radians/sec. These angular frequencies correspond to sine wave frequencies of about 318,000 Hz and 636,000 Hz. These frequencies were both selected in a range where the dielectric constant and conductivity of both water and ice are frequency independent, as discussed previously, and where reasonably accurate separation of capacitive reactance and resistance can be obtained. A RMS value for $V_0$ is typically 5 volts, into the known resistance, $R_0$, and in series with the sensor. The sensor has parallel capacitance, $C_T$, and resistance, $R_E$. The complex voltage $\overline{V}_1$, with real magnitude $V_1$, at the node 52 is shown from the following analysis: where:

$$\frac{\overline{V}_1}{V_0} = \frac{Z_1}{R_0 + Z_1} \tag{3}$$

$$= \frac{\frac{R_E}{(1 + j\omega_1 R_E C_T)}}{R_0 + \frac{R_E}{(1 + j\omega_1 R_E C_T)}}$$

$$= \frac{R_E}{R_0(1 + j\omega_1 R_E C_T) + R_E}$$

$$= \frac{R_E}{(R_0 + R_E + j\omega_1 R_0 R_E C_T)}$$

where:

$$Z_1 = \frac{\left(\frac{R_E}{j\omega_1 C_T}\right)}{\left(R_E + \frac{1}{j\omega_1 C_T}\right)} = \frac{R_E}{(1 + j\omega_1 R_E C_T)}$$

And therefore:

$$\left|\frac{\overline{V}_1}{V_0}\right| = \frac{V_1}{V_0} = \frac{R_E}{\sqrt{(R_0 + R_E)^2 + (\omega_1 R_0 R_E C_T)^2}}$$

So:

$$\frac{V_0}{V_1} R_E = \sqrt{(R_0 + R_E)^2 + (\omega_1 R_0 R_E C_T)^2}$$

And:

$$\frac{V_0^2}{V_1^2}(R_E)^2 = (R_0 + R_E)^2 + (\omega_1 R_0 R_E C_T)^2$$

At a second frequency ω2 (where ω2 is larger than ω1):

$$\left|\frac{\overline{V}_2}{V_0}\right| = \frac{V_2}{V_0} = \frac{R_E}{\sqrt{(R_0 + R_E)^2 + (\omega_2 R_0 R_E C_T)^2}} \tag{4}$$

So:

$$\frac{V_0}{V_2} R_E = \sqrt{(R_0 + R_E)^2 + (\omega_2 R_0 R_E C_T)^2}$$

Or:

$$\frac{V_0^2}{V_2^2} R_E^2 = (R_0 + R_E)^2 + (\omega_2 R_0 R_E C_T)^2$$

Subtract (3) from (4):

$$\frac{V_0^2}{V_2^2}(R_E)^2 - \frac{V_0^2}{V_1^2}(R_E)^2 = (R_0 + R_E)^2 + (\omega_2 R_0 R_E C_T)^2 -$$

$$(R_0 + R_E)^2 - (\omega_1 R_0 R_E C_T)^2$$

Or $$\frac{V_0^2}{V_2^2} - \frac{V_0^2}{V_1^2} = (\omega_2^2 - \omega_1^2) R_0^2 C_T^2$$

And therefore:

$$C_T = \frac{V_0}{R_0} \sqrt{\frac{\left(\frac{1}{V_2^2} - \frac{1}{V_1^2}\right)}{\omega_2^2 - \omega_1^2}},$$

where all terms are real measured magnitudes. Subtracting the fixed parallel capacitance due to the substrate and circuit gives:

$$C_E = \frac{V_0}{R_0} \sqrt{\frac{\left(\frac{1}{V_2^2} - \frac{1}{V_1^2}\right)}{\omega_2^2 - \omega_1^2}} - C_0$$

The value of $C_0$ can be found by measuring voltages when the surface is not coated with ice or water. For these measurements, the voltage value is represented by subscript 0's:

$$C_o = \frac{V_0}{R_0} \sqrt{\frac{\left(\frac{1}{V_{02}^2} - \frac{1}{V_{01}^2}\right)}{\omega_2^2 - \omega_1^2}}$$

The final equation for capacitance is:

$$C_E = \frac{V_0 \left\{ \sqrt{\left(\frac{1}{V_2^2} - \frac{1}{V_1^2}\right)} - \sqrt{\left(\frac{1}{V_{02}^2} - \frac{1}{V_{01}^2}\right)} \right\}}{R_0 \sqrt{\omega_2^2 - \omega_1^2}} \tag{5}$$

This equation is in a form which can be represented by:

$$C_E = K_1 \frac{\sqrt{V_1^2 - V_2^2}}{V_1 V_2} - K_2 \tag{6}$$

where $K_1$ and $K_2$ are known or calibratable constants.

The result of applying the measured voltages into equation (6) would give the capacitance value over the sensor. If the ice conductivity and dielectric constants were completely frequency independent, the capacitance calculated would be exact (to the accuracy limit of the measurements). Even with slight variations in ice conductivity and dielectric constants with frequency, the variation would be the same relative amount for the two sensors, so such variation can be removed with suitable combining of the results for the two sensors.

The capacitance variation with thickness is initially approximately linear, and rolls off to an asymptotic value at thicknesses larger than the electrode gap width. Because the initial growth of the thickness is generally of greatest interest, the initial linear relation between thickness and capacitance is first selected to represent small to moderate thicknesses. From (6), we have the initial values:

$$\text{Thickness} = K_3 C_E = K_4 \frac{\sqrt{V_1^2 - V_2^2}}{V_1 V_2} + K_5 \tag{7}$$

and a simple calibration determines the coefficients. If the dielectric constant were known, and the geometry properly taken into account, this information would give the thickness determining relation of the material over the gage for a limited thickness range.

If the thickness variation is required over a larger thickness range, a non-linear representation is needed. This representation can either be determined experimentally or by a theoretical model. The exact nature of the response curve can vary depending on both the geometry of the sensor and the surface shape the gage is mounted on. An example of a response curve might look like:

$$\text{Thickness} = -K_6 \ln\left[1 - \frac{C}{C_\infty}\right], \tag{8}$$

where $C_0$ is the large thickness value.

Because different density variations can exist (e.g., snow vs. solid ice) or a significant amount of liquid may be present, the dielectric constant will generally not be known. For those cases, the two-gage method of U.S. Pat. No. 4,766,369, which is hereby incorporated by reference, is used to remove the need for knowing the actual dielectric constant, but for the present Example, the two-gage method would be combined with the measurement of two frequencies to remove the conductivity effect.

If the same supply voltage and frequencies are used, the ratio of capacitance for two sensors (from equation 5) can be shown to be:

$$\frac{C_{E_L}}{C_{E_S}} = \frac{\left\{\sqrt{\left(\frac{1}{V_{2_L}^2} - \frac{1}{V_{1_L}^2}\right)} - \sqrt{\left(\frac{1}{V_{02_L}^2} - \frac{1}{V_{01_L}^2}\right)}\right\}}{\left\{\sqrt{\left(\frac{1}{V_{2_S}^2} - \frac{1}{V_{1_S}^2}\right)} - \sqrt{\left(\frac{1}{V_{02_S}^2} - \frac{1}{V_{01_S}^2}\right)}\right\}} \tag{9}$$

The subscript L is for the large sensor 18, and s is for the small sensor 16. For this Example, the variation of the ratio can be used for unknown dielectric constant value in the same way as the capacitance for a single large sensor when the dielectric constant is known. For that Example, (9) is treated like (7):

$$\text{Thickness} = K_7 \frac{C_{E_L}}{C_{E_S}} = K_7 \frac{\left\{\sqrt{\left(\frac{1}{V_{2_L}^2} - \frac{1}{V_{1_L}^2}\right)} - \sqrt{\left(\frac{1}{V_{02_L}^2} - \frac{1}{V_{01_L}^2}\right)}\right\}}{\left\{\sqrt{\left(\frac{1}{V_{2_S}^2} - \frac{1}{V_{1_S}^2}\right)} - \sqrt{\left(\frac{1}{V_{02_S}^2} - \frac{1}{V_{01_S}^2}\right)}\right\}} \tag{10}$$

Again, calibration in known conditions determines the coefficient $K_7$.

When the thickness of the ice, or mixture of ice and water is less than ½ the electrode gap spacing of sensor 18, the variation in thickness causes an approximately linear change in the measured total impedance. When the thickness of the ice and water layer exceeds ½ the spacing, the response becomes progressively more non-linear. For a thickness about equal to the spacing, the sensitivity to additional thickness change is greatly reduced. Accordingly, electrode gap spacing for sensor 18 is best selected to be at least twice the thickness of any expected ice and water layer.

Referring again to FIG. 1, a preferred operating scenario is now described. Since circuits 24 and 26 are sensitive to the presence of water as well as a mixture of ice and water, temperature measuring circuit 28 can control, via processor 42, when circuits 24 and 26 are activated to operate. For example, when temperature measuring circuit 28 measures a temperature for which ice formation is not possible, (>0° C.), circuits 24 and 26 are inactive. Once temperature measuring circuit 28 measures a temperature in the range of concern for ice formation, processor 42 controls circuits 24 and 26 to toggle between the first and second operating frequencies $f_1$ and $f_2$. As described above, device 11 then produces a measurement based on supply and measured voltages for both sensors at both frequencies. The resultant thickness of the ice or mixture of ice and liquid is displayed on display 44. Note that processor 42 is also used to control heaters or other deicing equipment (not shown) in response to the detection of ice build-up.

The advantages of the present invention are numerous. By being sensitive to the mere formation of ice, the present invention is an early-warning system. Thus, critical situations created by the presence of solid ice can be averted. The device is simple to fabricate and use thereby making its realization cost effective.

An alternative embodiment of the present invention would be a device 11 comprising a single geometry sensor operating at two predetermined frequencies. This approach requires a far simpler system. The measured output capacitance is plotted against known thicknesses of ice or mixtures of ice and liquid for direct calibration. This calibration then gives the values of unknown thicknesses. The error for this approach is mainly due to the actual variation in the ice dielectric constant and conductivity for the two frequencies used.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by letters patent of the United States is:

1. An apparatus, comprising:
   a first total impedance sensor for sensing total impedance changes due to the presence of an accumulated material on an outer surface of an object;
   a first total impedance measuring circuit coupled to said first total impedance sensor for producing output voltages based on said total impedance changes sensed by said first total impedance sensor when said first total impedance measuring circuit is operated at a first frequency and a second frequency when said surface is dry and when said surface is covered by the accumulated material, said first frequency and said second frequency both being in a range wherein the dielectric constant and conductivity of the accumulated material vary slightly from said first frequency to said second frequency;
   a second total impedance sensor for sensing total impedance changes due to the presence of the accumulated material;
   a second total impedance measuring circuit coupled to said second total impedance sensor for producing output voltages based on said total impedance changes sensed by said second total impedance sensor when said second total impedance measuring circuit is operated at said first frequency and said second frequency when said surface is dry and when said surface is covered by the accumulated material; and
   a processor coupled to said first total impedance measuring circuit and said second total impedance measuring circuit for calculating an output value using said output voltages produced by said first total impedance measuring circuit and said second total impedance measuring circuit, wherein said output value is used to determine the thickness of the accumulated material.

2. An apparatus as in claim 1 further comprising a temperature measuring device for providing an indication of the temperature of the outer surface.

3. An apparatus as in claim 1 wherein said first total impedance sensor comprises two leads parallel to one another, with each of said two leads each having electrodes extending therefrom such that said electrodes of one of said two leads are interleaved with said electrodes of the other of said two leads.

4. An apparatus as in claim 1 wherein said second total impedance sensor comprises two parallel leads.

5. An apparatus as in claim 4 wherein said two parallel leads are separated by a distance that is at least twice the thickness of any expected thickness of the accumulated material desired to be measured.

6. An apparatus as in claim 1 further comprising an embedding material placed in a hollowed out portion of the outer surface and smoothed with the contours of the outer surface, said embedding material embedding said first total impedance sensor and said second total impedance sensor into said object.

7. An apparatus as in claim 1 further comprising a patch of embedding material placed over the outer surface and smoothed close to the contours of the outer surface, said patch embedding said first total impedance sensor and said second total impedance sensor into said object.

8. An apparatus as in claim 6 wherein said embedding material is selected from the group of plastic, epoxy, rubber, and ceramic materials.

9. An apparatus as in claim 7 wherein said patch is selected from the group of plastic, epoxy, rubber, and ceramic materials.

10. An apparatus as in claim 6 wherein said embedding material has stable and low electrical conductivity and a stable and low dielectric constant.

11. A method of determining the thickness of an accumulated material on an outer surface of an object, comprising the steps of:

providing a first total impedance sensor that senses total impedance changes due to the presence of the accumulated material;

providing a first total impedance measuring circuit coupled to said first total impedance sensor that produces output voltages based on said total impedance changes sensed by said first total impedance sensor;

operating said first total impedance measuring circuit at a first frequency and a second frequency when the outer surface of the object is dry;

operating said first total impedance measuring circuit at (a) said first frequency and (b) said second frequency when the accumulated material is present on the outer surface of the object, said first frequency and said second frequency both being in a range wherein the dielectric constant and conductivity of the accumulated material vary only slightly from said first frequency to said second frequency;

providing a second total impedance sensor that senses total impedance changes due to the accumulated material;

providing a second total impedance measuring circuit coupled to said second total impedance sensor that produces output voltages based on said total impedance changes sensed by said second total impedance sensor;

operating said second total impedance measuring circuit at said first frequency and said second frequency when the outer surface of the object is dry;

operating said second total impedance measuring circuit at said first frequency and said second frequency when the accumulated material is present on the outer surface of the object;

generating an output value using said output voltages produced by said first total impedance measuring circuit and said second total impedance measuring circuit, wherein said output value is proportional to the thickness of the accumulated material;

calibrating the output value with known thicknesses of accumulated material to determine the proportional constants; and operating the system with unknown thickness layers of accumulated material and determining the thickness from the calibration.

12. A method as in claim 11 wherein only the second sensor is used at two frequencies to determine the thickness of the accumulated material.

* * * * *